US007809690B2

(12) United States Patent
Pommerenk et al.

(10) Patent No.: US 7,809,690 B2
(45) Date of Patent: Oct. 5, 2010

(54) PERFORMANCE METRIC-BASED SELECTION OF ONE OR MORE DATABASE SERVER INSTANCES TO PERFORM DATABASE RECOVERY

(75) Inventors: Stefan Pommerenk, Hayward, CA (US); Carol Colrain, Redwood Shores, CA (US); Wilson Chan, San Mateo, CA (US); Angelo Pruscino, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1305 days.

(21) Appl. No.: 10/891,433

(22) Filed: Jul. 13, 2004

(65) Prior Publication Data
US 2006/0015542 A1   Jan. 19, 2006

(51) Int. Cl.
*G06F 17/30* (2006.01)
(52) U.S. Cl. .............. 707/674; 707/675; 707/678; 707/679
(58) Field of Classification Search ................ 707/202, 707/674–686
See application file for complete search history.

(56) References Cited

U.S. PATENT DOCUMENTS

| 5,799,305 | A | * | 8/1998 | Bortvedt et al. ............ 707/10 |
| 6,070,191 | A | * | 5/2000 | Narendran et al. ......... 709/226 |
| 6,145,089 | A | * | 11/2000 | Le et al. ..................... 714/4 |
| 6,167,490 | A | * | 12/2000 | Levy et al. ................. 711/148 |
| 6,311,144 | B1 | * | 10/2001 | Abu El Ata .................. 703/2 |
| 6,411,968 | B2 | | 6/2002 | Bamford et al. |
| 6,507,853 | B2 | | 1/2003 | Bamford et al. |
| 6,571,288 | B1 | * | 5/2003 | Sarukkai .................... 709/226 |
| 6,678,704 | B1 | | 1/2004 | Bridge et al. |
| 7,069,267 | B2 | * | 6/2006 | Spencer, Jr. ................ 707/10 |
| 2003/0110421 | A1 | * | 6/2003 | Kurinami et al. ........... 714/47 |
| 2004/0153479 | A1 | * | 8/2004 | Mikesell et al. ............ 707/200 |

FOREIGN PATENT DOCUMENTS

EP    1176509 A2    1/2002

OTHER PUBLICATIONS

Oracle Corporation, "Oracle9i, Recovery Manager Quick Reference, Release 2 (9.2)," Mar. 2002, Part No. A96564-01, pp. 1-28.

(Continued)

*Primary Examiner*—John E Breene
*Assistant Examiner*—Thu-Nguyet Le
(74) *Attorney, Agent, or Firm*—Hickman Palermo Truong & Becker LLP; Christian A. Nicholes

(57) ABSTRACT

A method and apparatus for selecting one or more instances to perform database recovery is provided. According to one aspect, one or more performance metrics are determined for each instance on each node in a cluster. Based on these performance metrics, which may be weighted to give one or more metrics more significance relative to the other metrics, an overall score is determined for each instance on each surviving node when a node in the cluster fails. One or more instances with the highest of these scores are selected. The selected instances are assigned the task of performing the database recovery process. Because instances best able to handle to database recovery process are selected, the database recovery process consumes less time, thereby making data accessible in less time after a node fails.

18 Claims, 3 Drawing Sheets

OTHER PUBLICATIONS

Oracle Corporation, Oracle9i, Recovery Manager Reference, Release 2 (9.2), Mar. 2002, Part No. A96565-01, pp. 1-292 (text provided on CD-ROM).

Oracle Corporation, Oracle9i, Recovery Manager User's Guide, Release 2 (9.2), Mar. 2002, Part No. A96566-01, pp. 1-576 (text provided on CD-ROM).

* cited by examiner

PERFORMANCE METRIC-BASED SELECTION OF ONE OR MORE DATABASE SERVER INSTANCES TO PERFORM DATABASE RECOVERY

FIELD OF THE INVENTION

The present invention relates to databases, and in particular, to selecting, based on one or more performance metrics, one or more database server instances to perform database recovery.

BACKGROUND

A "cluster" is made up of multiple "nodes," each of which executes one or more database server instances that read data from and write data to a database that is located on shared storage. Each node may be a separate computing device. Nodes may communicate with other nodes and the shared storage through a network and/or other communication mechanisms.

Clusters offer many benefits not available in alternative data processing configurations. The computational power offered by a cluster of relatively inexpensive nodes often rivals the computational power offered by a single, much more expensive, computing device. Individual nodes can be added to or removed from a cluster according to need. Thus, clusters are highly scalable. Even when one node in a cluster fails, other nodes in the cluster may continue to provide services. Thus, clusters are highly fault-tolerant.

Each node in a cluster is associated with a numeric node identifier. Typically, the first node to join a cluster is assigned an identifier of "1." The next node to join the cluster is typically assigned an identifier of "2." As more nodes join the cluster, those nodes typically are assigned numerically increasing identifiers.

As time progresses, technology advances. Consequently, nodes that have been in a cluster the longest often are the least computationally powerful. Nodes that have joined a cluster most recently often are the most computationally powerful. Due to the manner in which identifiers are assigned, the numerically lowest identifiers are often, although not always, assigned to the least computationally powerful nodes.

As mentioned above, each node in a cluster may execute one or more database server instances, referred to herein simply as "instances." Each such instance may have a separate buffer cache stored in the memory of the node on which that instance is resident. When a particular instance needs to access a block of data from the database, the instance determines whether the block is stored in any instance's buffer cache. If the block is stored in some instance's buffer cache, then the particular instance obtains the block from that buffer cache and places the block in the particular instance's buffer cache, unless the block is already stored in the particular instance's buffer cache. If the block is not stored in any instance's buffer cache, then the particular instance reads the block from the database and places the block in the particular instance's buffer cache. Either way, the particular instance can then access the block from the particular instance's buffer cache instead of the database. Accessing a block from a buffer cache is significantly faster than accessing a block from the database.

When an instance accesses a block, the instance may do so for the purpose of modifying the block. The instance modifies the block that is in the instance's buffer cache. In order to reduce the amount of writing to the database, which degrades performance, the writing of the modified block to the database might be deferred for some period of time. To protect against node failure, a "redo log" stored in the database maintains a history of modifications that the instance performs on data blocks.

Sometimes, nodes fail. When a node fails, the blocks stored in the buffer caches resident on that node may be lost. Some of those lost blocks might be blocks that were modified but not yet written to the database. In such a situation, a recovery process needs to be initiated so that the database contains the correct blocks. According to one approach, an instance resident on the surviving node that has the lowest numerical identifier is selected from among instances resident on surviving nodes in the cluster. The selected instance is given the task of performing the recovery process.

Selecting an instance in this manner is quick and easy. However, as is explained above, the nodes that have the lowest numerical identifiers often have the least computational power of any nodes in the cluster. When an instance on a node with relatively low computational power is selected to perform the recovery process, the recovery process takes a longer period of time to complete. To prevent potentially incorrect data from being retrieved from the database or surviving buffer caches, some blocks of data are made inaccessible until certain phases of the recovery process are completed. Selecting an instance to perform the recovery process according to the above approach often maximizes the period of inaccessibility.

An alternative approach to selecting an instance to perform the recovery process might involve selecting an instance resident on the surviving node that has the numerically highest identifier of surviving nodes in the cluster. Such an approach would be just as fast and simple as the approach described above, and might result in the selection of an instance on a node with relatively high computational power. However, there is no guarantee that the node that has the numerically highest identifier will always be the most computationally powerful node. There is always the possibility that the node that has the computationally lowest power will have the numerically highest identifier.

These are some of the problems that attend approaches to the selection of an instance to perform database recovery. Because of these problems, approaches to such instance selection leave much to be desired. A technique that overcomes these problems is needed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus is described for selecting, based on one or more performance metrics, one or more database server instances to perform database recovery. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

In order to better select one or more instances to perform database recovery, according to one embodiment of the invention, one or more performance metrics are determined for each instance on each node in a cluster. These performance metrics may include, for example, measurements of how many free buffer cache resources are available on each node, measurements of the number and speed of processors contained in each node, measurements of how busy each node is, and/or measurements of the response times of instances resident on each node. The performance metrics provide a way of determining which nodes, and the instances resident thereon, are best able to handle the database recovery process.

Based on these and/or other performance metrics and factors, which may be weighted to give one or more metrics and factors more significance relative to the other metrics and factors, an overall score is determined for each instance on each surviving node when a node in the cluster fails. One or more instances with the highest of these scores are selected. The selected instances are assigned the task of performing the database recovery process. Because instances best able to handle to database recovery process are selected, the database recovery process consumes less time, thereby making data accessible in less time after a node fails.

Example Cluster

Figure 1:
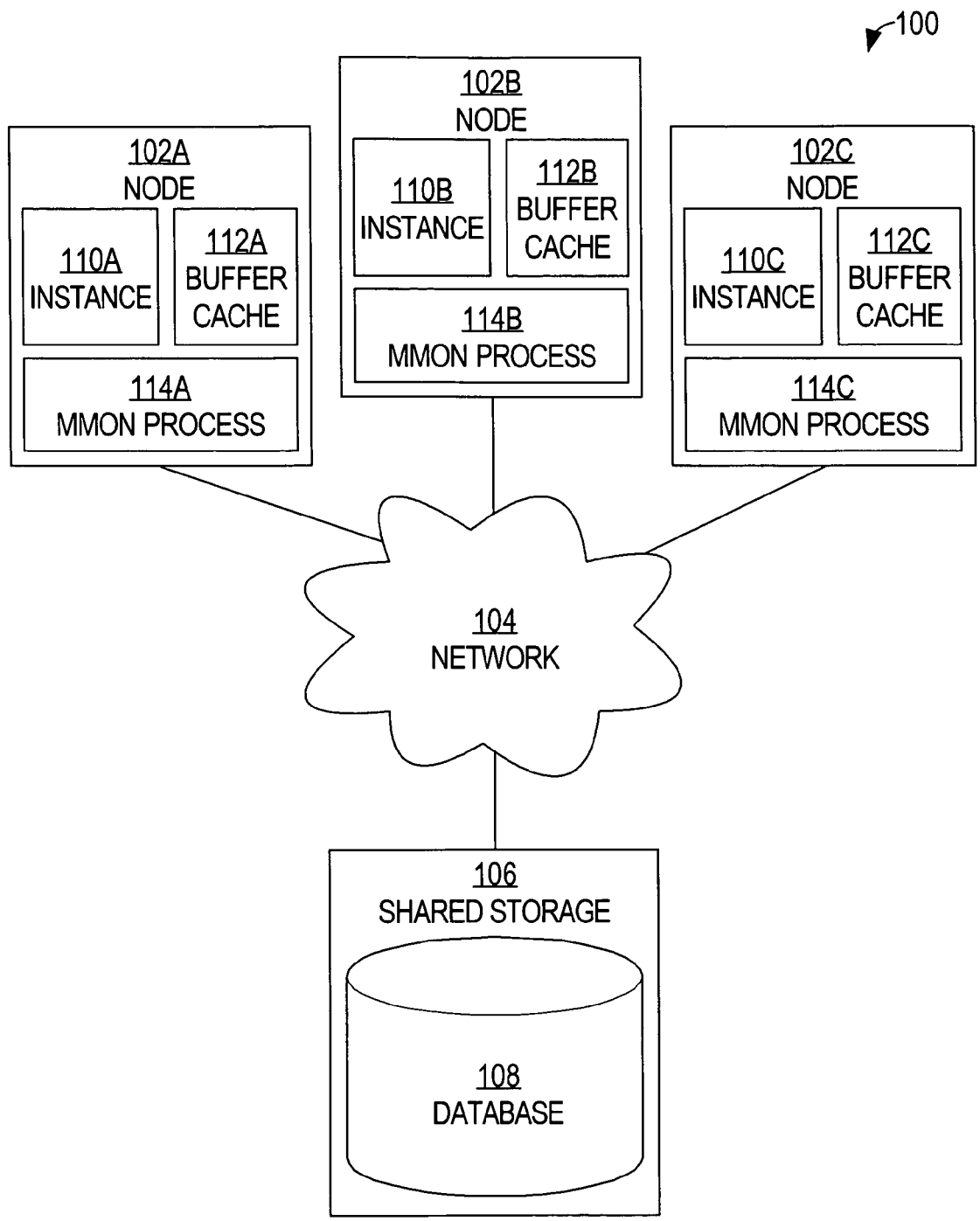
FIG. 1 is a block diagram that illustrates a system, according to an embodiment of the present invention, in which one or more instances are selected, based on one or more performance metrics, to perform database recovery.

FIG. 1 is a block diagram that illustrates a system 100, according to an embodiment of the present invention, in which one or more instances are selected, based on one or more performance metrics, to perform database recovery. System 100 comprises nodes 102A, 102B, and 102C. Each of nodes 102A, 102B, and 102C is coupled communicatively with a network 104. Network 104 may be, for example, a local area network (LAN) or a wide area network (WAN). System 100 also comprises a shared storage 106, which is also coupled communicatively with network 104. Thus, through network 104, nodes 102A-C can access each other and shared storage 106.

Shared storage 106 may be, for example, a persistent storage mechanism such as a hard disk drive. Shared storage 106 contains a database 108. Database 108 comprises one or more data blocks. These blocks collectively contain database objects such as database tables. Each block may occupy a specified amount of storage space on shared storage 106.

Each of nodes 102A-C runs one or more database server instances. For example, an instance 110A is resident on node 102A, an instance 110B is resident on node 102B, and an instance 110C is resident on node 102C. Each of instances 110A-C comprises one or more processes. Each of instances 110A-C is designed to access data stored in database 108.

Each of instances 110A-C uses and is associated with a buffer cache that may be stored in the memory of the node on which that instance resides. For example, instance 110A uses a buffer cache 112A, instance 110B uses a buffer cache 112B, and instance 110C uses a buffer cache 112C. Each of buffer caches 112A-C comprises a plurality of buffer cache resources. Each such buffer cache resource is the memory storage size of a single data block of database 108. Thus, each buffer cache resource can store one block. A buffer cache resource is considered to be "free" if that buffer cache resource does not currently contain a block. The number of buffer cache resources in a particular buffer cache may be user-specified, and may be limited by the memory resources of the node on which the buffer cache resides.

Each of nodes 102A-C has one or more processors. For example, node 102A may have eight processors, node 102B may have eight processors, and node 102C may have four processors. Each processor is able to perform tasks concurrently with each other processor. Processors may operate at different clock speeds. For example, processors in node 102A may operate at 1 gigahertz, processors in node 102B may operate at 2 gigahertz, and processors in node 102C may operate at 1 gigahertz. The number and speed of processors in a particular node influences the node's computational power.

Each of nodes 102A-C has an associated utilization metric that typically varies with time. A node's utilization is a measure of the portion of that node's processing resources that are being used. A node executing many processes tends to be more utilized than a node executing few processes. For example, at a given moment in time, node 102A might be 90% utilized, node 102B might be 50% utilized, and node 102C might be 10% busy. A node's "idleness" is the opposite of the node's utilization. For example, a node having a utilization of 90% has an idleness of 10%. A node's average utilization or idleness over a specified period of time may be measured.

Each of nodes 102A-C has an associated run queue. A node's run queue indicates programs that are waiting to be executed on the node. When a node's processing resources are utilized to the extent that the node is unable to execute a particular program concurrently with the processes already executing on the node, the node places the particular program in the node's run queue. When the node is able to execute a program waiting in the node's run queue, the node removes the program from the run queue and executes the program. If programs are placed in the run queue faster than programs are removed from the run queue, the length of the run queue increases. The length of a node's run queue is indicative of how busy the node is.

Each of instances 110A-C receives requests, such as requests to store, retrieve, and/or modify data in database 108. The interval measured from the time that an instance receives a request to the time that the instance responds to the request is called the instance's "response time." If an instance has failed or is in a "blocked" state, then the instance will have a relatively large response time. An instance's average response time over a specified period of time may be measured.

Each of instances 110A-C is associated with a separate "management monitor" ("MMON") process that is resident on that instance's node. For example, instance 110A is associated with MMON process 114A, instance 110B is associated with MMON process 114B, and instance 110C is associated with MMON process 114C. MMON processes 114A-C periodically and automatically measure statistics concerning the instances with which the MMON processes are associated and the nodes on which the MMON processes are resident. MMON processes 114A-C store these statistics on shared storage 106, so that the statistics are accessible to all of instances 110A-C. The data structure in which the statistics are stored is called an "automatic workload repository." The statistics in the automatic workload repository are used as performance metrics for each of instances 110A-C.

In one embodiment, each of MMON processes 114A-C stores, in the automatic workload repository, an indication of the number and speeds of the processors of the node on which the MMON process is resident (the "MMON process' node"), an indication of the length of the run queue of the MMON process' node, an indication of the average utilization or idleness of the MMON process' node during a specified time period, an indication of the number of free buffer cache resources in the MMON process' associated instance's buffer cache, and an indication of the MMON process' associated instance's average response time during a specified time period. In one embodiment, each of MMON processes 114A-C stores the above statistics in a "statistics register" on the MMON process' node.

Selecting One or More Recovery Instances

Figure 2:
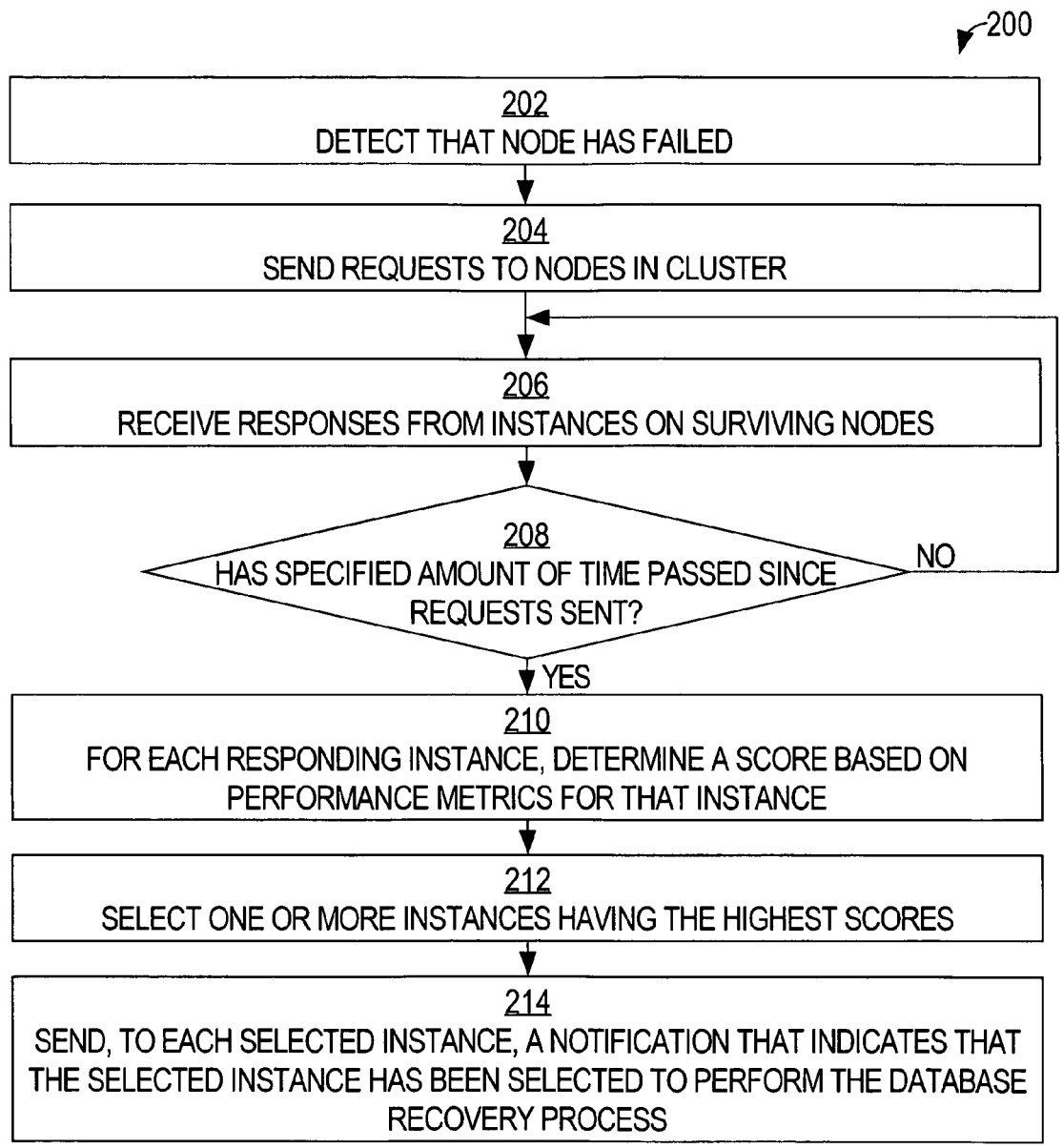
FIG. 2 is a flow diagram that illustrates a technique, according to an embodiment of the present invention, for selecting, based on one or more performance metrics, one or more instances to perform database recovery.

FIG. 2 is a flow diagram that illustrates a technique 200, according to an embodiment of the present invention, for selecting, based on one or more performance metrics, one or more instances to perform database recovery. In block 202, an instance detects that a node in the cluster has failed. For example, instance 110A might detect that node 102C has failed. As a result, instance 110A becomes the "detecting instance." Techniques for detecting node failure are well known.

In block 204, the detecting instance sends a request to all of the nodes in the cluster. The request asks each instance to send a response back to the detecting instance so that the detecting instance can determine which other instances are current candidates for selection as the recovery instance. For example, instance 110A might send a request to nodes 102B and 102C. Consequently, instance 110B receives a request from instance 110A.

In one embodiment, upon receiving a request as described above, the recipient instance sends, to the instance that sent the request, a response that indicates one or more performance metrics pertaining to the recipient instance. In an alternative embodiment, upon receiving such a request, the recipient instance responds with an acknowledgement and stores one or more such performance metrics in a specified repository that is accessible to the instance that sent the request. In one embodiment, the recipient instance obtains the performance metrics from a "statistics register" into which an MMON process has stored the performance metrics, as described above.

In block 206, the detecting instance receives one or more responses from other instances resident on surviving nodes in the cluster. In one embodiment, each response indicates one or more performance metrics, such as are described above, for the responding instance. The detecting instance adds, to a set of candidate recovery instances, the identity of each instance from which the detecting instance receives a response.

In block 208, the detecting instance determines whether a specified amount of time has passed since the detecting instance sent the requests. For example, instance 110A might determine whether a user-specified period of time, such as 1.5 seconds, has passed since instance 110A sent requests to the other nodes in the cluster. If at least the specified amount of time has passed, then control passes to block 210. Otherwise, control passes back to block 206.

In block 210, for each of the detecting instance and each particular instance that sent a response, the detecting instance determines a score based on performance metrics, such as those described above, for that instance. In one embodiment, the detecting instance obtains the performance metrics for a particular instance from the response that the detecting instance received from the particular instance. In an alternative embodiment, the detecting instance obtains the performance metrics for a particular instance from a specified repository in which the particular instance stored the performance metrics. The detecting instance also determines a score for itself.

In determining the score for a particular instance, the detecting instance may weight one or more of the particular instance's performance metrics so that some of the particular instance's performance metrics are more significant to the determination of the score than others of the particular instance's performance metrics. For example, to determine a score for a particular instance, the detecting instance might multiply the idleness of the particular instance's node's processing resources by two, multiply by four the product of the particular instance's node's number of processors and the speed of those processors, and multiply by five the number of free buffer cache resource in the instance's buffer cache. The detecting instance might add all of the particular instance's "positive" weighted performance metrics and subtract, from the sum, all of the particular instance's "negative" weighted performance metrics, to produce an overall score for the particular instance.

In block 212, from among the particular instances and the detecting instance, the detecting instance selects one or more instances having the highest scores to be the recovery instances. For example, if one recovery instance is to be selected and instance 110B has a higher score than instance 110A, then instance 110A may select instance 110B to be the recovery instance. In one embodiment, as many instances as are specified by a user are selected to be the recovery instances. In one embodiment, instances whose collective free buffer cache resources are at least as large as the number of blocks that need to be recovered are selected to be the recovery instances. This number may be estimated before the recovery process begins. In one embodiment, instances in a "blocked" state are excluded from selection as recovery instances.

In block 214, the detecting instance sends, to each of the selected instances, a notification that the selected instance has been selected to be a recovery instance. Upon receiving the notifications, the recovery instances collectively may perform the database recovery process. An implementation of the database recovery process is described below.

Database Recovery Process

Techniques are described above for selecting one or more instances to perform database recovery. Database recovery may involve the reconstruction of resource mastery information, and the recovery of blocks that were present in buffer caches that were resident on failed nodes. In one embodiment, the database recovery process comprises a "roll forward" stage, in which lost modifications to blocks are "replayed," followed by a "roll back" stage, in which modifications that were not committed are "undone." The "roll forward" stage may comprise multiple phases. An example of the multiple phases of a "roll forward" stage follows.

In one embodiment, the "roll forward" stage comprises three phases: a "first pass" phase, a "claiming" phase, and a "second pass" phase. In the "first pass" phase, an instance selected to perform database recovery (the "recovery instance") reads redo logs in order to determine which blocks need to be recovered. The blocks that need to be recovered are those that were (a) modified since being placed in a buffer cache resident on a failed node and (b) not written to a database since the modification. Based on the information in the redo logs, the recovery instance determines a "recovery set" that indicates all of the blocks that need to be recovered.

In the "claiming" phase, the recovery instance finds the most recent "good" version of each block that the recovery set indicates, and copies or moves each such version to the recovery instance's associated buffer cache (the "recovery cache"). The most recent good version of a block might be obtained from a surviving instance's buffer cache or from shared storage.

In the "second pass" phase, the recovery instance applies, to the blocks placed in the recovery cache, the modifications applicable to those blocks as indicated in the redo logs. Once the recovery instance has applied the modifications to the blocks, the recovery instance writes the blocks to shared storage. Blocks written to shared storage may be cleared from the recovery cache to make room for other blocks. Once the recovery instance has written a particular block to shared storage, the particular block is considered to be recovered, and other instance can access the particular block thereafter.

During the "claiming" phase, if the recovery cache is filled before all of the blocks indicated in the recovery set have been placed in the recovery cache, then the recovery instance performs the "second pass" phase relative to the blocks that have been placed in the recovery cache, and then repeats the "claiming" phase relative to the blocks that have not yet been placed in the recovery cache. If the recovery cache is too small, or is too full, then the recovery instance might need to perform the "claiming/second pass" cycle numerous times, delaying the availability of the data being recovered. Thus, instances associated with large and relatively empty buffer caches might be preferred for selection as recovery instances over instances associated with small or relatively full buffer caches.

Although the database recovery process is discussed above in the context of one recovery instance for purposes of example, several separate recovery instances may operate in parallel to perform the database recovery process.

Hardware Overview

Figure 3:
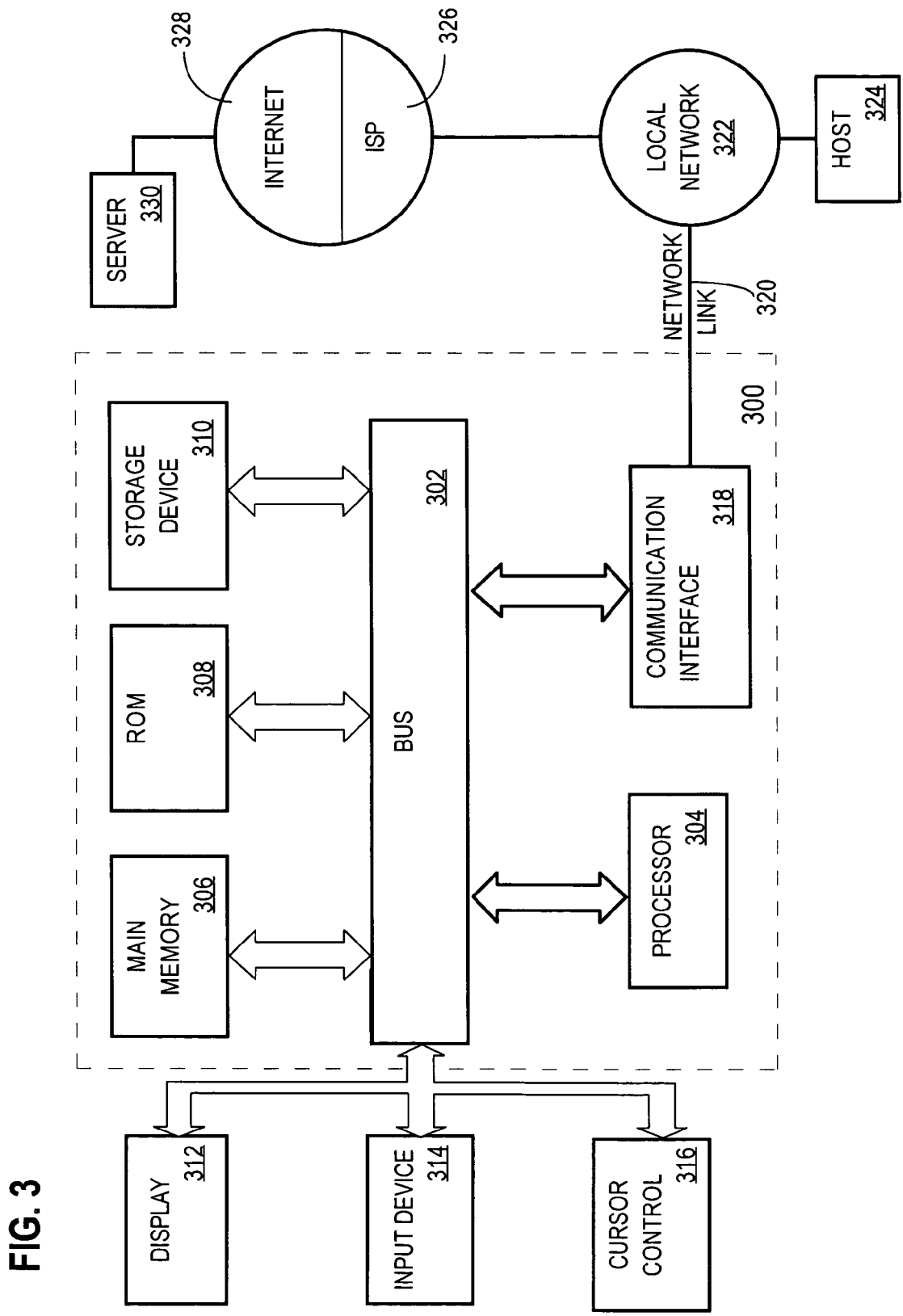
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use a transmitter to convert the data to a signal. An detector can receive the data carried in the signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of selecting one or more database server instances to perform database recovery, the method comprising:
   determining, for each database server instance on each node of a plurality of nodes in a cluster, one or more performance metrics;
   selecting, based on the one or more performance metrics for each database server instance, one or more particular database server instances to perform database recovery; and
   the one or more articular database server instances performing said database recovery relative to data blocks that were present in a cache of a failed node of a relational database system;
   wherein said selecting comprising selecting the one or more particular database server instances to perform, relative to the data blocks, steps comprising:
      (a) replaying lost modifications the data blocks, followed by
      (b) undoing, relative to the data blocks relative to which the lost modifications were replayed, modifications that were not committed; and
   wherein the method is performed by one or more computing devices.

2. The method of claim 1, wherein the one or more performance metrics includes a measurement of a speed of processors contained in a node.

3. The method of claim 1, wherein the one or more performance metrics includes a measurement of an idleness of processors contained in a node.

4. The method of claim 1, wherein the one or more performance metrics includes a measurement of a number of free buffer cache resources of a buffer cache associated with a database server instance.

5. The method of claim 1, wherein the one or more performance metrics includes at least one of: (a) a measurement of a time taken for a database server instance to respond to a request and (b) a measurement of a number of processors contained in a node.

6. The method of claim 1, wherein the one or more performance metrics includes a measurement of a length of a run queue on a node.

7. The method of claim 1, further comprising:
   determining that a node in the plurality of nodes has failed;
   in response to a determination that a node in the plurality of nodes has failed, sending, to one or more nodes in the plurality of nodes, a request; and
   receiving, from one or more nodes in the plurality of nodes, one or more responses to the request, wherein the one or more responses indicate the one or more performance metrics.

8. The method of claim 1, further comprising:
   determining that a node in the plurality of nodes has failed;
   in response to a determination that a node in the plurality of nodes has failed, sending, to one or more nodes in the plurality of nodes, a request;
   receiving, from one or more nodes in the plurality of nodes, one or more responses to the request; and
   in response to receiving one or more responses to the request, reading the one or more performance metrics from a specified repository.

9. The method of claim 1, wherein the step of selecting one or more particular database server instances to perform database recovery further comprises:
   estimating a number of data blocks to be recovered;
   determining that a plurality of particular server instances collectively have a number of free buffer cache resources that is at least as large as the estimated number of data blocks;
   wherein a particular server instance of the plurality of particular server instances is associated with a buffer cache comprising a plurality of buffer cache resources;
   wherein a particular buffer cache resource of the plurality of buffer cache resources stores one data block; and
   sending, to the plurality of particular server instances, a notification that indicates selection as a database server instance to perform database recovery.

10. A volatile or non-volatile computer-readable storage medium carrying one or more sequences of instructions which, when executed by one or more processors, causes the one or more processors to perform the method recited in claim 1.

11. A volatile or non-volatile computer-readable storage medium carrying one or more sequences of instructions which, when executed by one or more processors, causes the one or more processors to perform the method recited in claim 2.

12. A volatile or non-volatile computer-readable storage medium carrying one or more sequences of instructions which, when executed by one or more processors, causes the one or more processors to perform the method recited in claim 3.

13. A volatile or non-volatile computer-readable storage medium carrying one or more sequences of instructions which, when executed by one or more processors, causes the one or more processors to perform the method recited in claim 4.

14. A volatile or non-volatile computer-readable storage medium carrying one or more sequences of instructions which, when executed by one or more processors, causes the one or more processors to perform the method recited in claim 5.

15. A volatile or non-volatile computer-readable storage medium carrying one or more sequences of instructions which, when executed by one or more processors, causes the one or more processors to perform the method recited in claim 6.

16. A volatile or non-volatile computer-readable storage medium carrying one or more sequences of instructions which, when executed by one or more processors, causes the one or more processors to perform the method recited in claim 7.

17. A volatile or non-volatile computer-readable storage medium carrying one or more sequences of instructions which, when executed by one or more processors, causes the one or more processors to perform the method recited in claim 8.

18. A volatile or non-volatile computer-readable storage medium carrying one or more sequences of instructions which, when executed by one or more processors, causes the one or more processors to perform the method recited in claim 9.

* * * * *

UNITED STATES PATENT AND TRADEMARK OFFICE
CERTIFICATE OF CORRECTION

| | | |
|---|---|---|
| PATENT NO. | : 7,809,690 B2 | Page 1 of 1 |
| APPLICATION NO. | : 10/891433 | |
| DATED | : October 5, 2010 | |
| INVENTOR(S) | : Stefan Pommerenk et al. | |

It is certified that error appears in the above-identified patent and that said Letters Patent is hereby corrected as shown below:

In column 9, line 64, in claim 1, delete "articular" and insert -- particular --, therefor.

In column 10, line 1, in claim 1, delete "comprising" and insert -- comprises --, therefor.

In column 10, line 4, in claim 1, after "modifications" insert -- relative to --.

Signed and Sealed this
Thirty-first Day of May, 2011

David J. Kappos
*Director of the United States Patent and Trademark Office*